Dec. 23, 1952 A. M. MASON 2,622,635
BOWLING PIN DRESSING MACHINE
Filed Oct. 25, 1950 2 SHEETS—SHEET 1
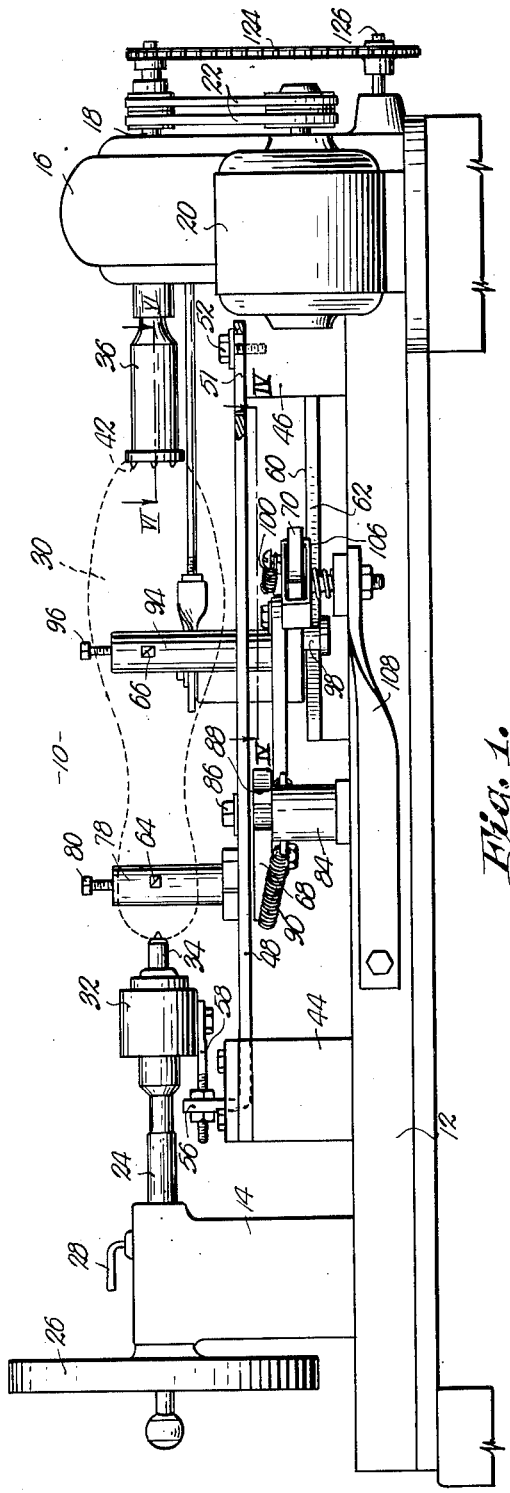
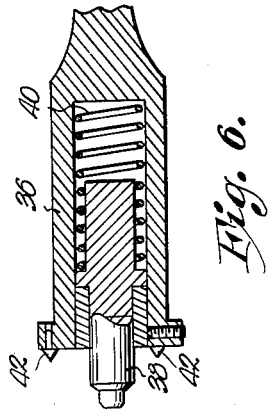
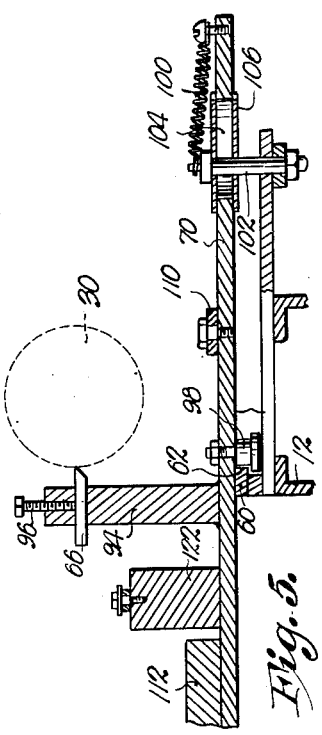
INVENTOR.
Arie M. Mason
BY
ATTORNEY.

Dec. 23, 1952  A. M. MASON  2,622,635
BOWLING PIN DRESSING MACHINE
Filed Oct. 25, 1950  2 SHEETS—SHEET 2
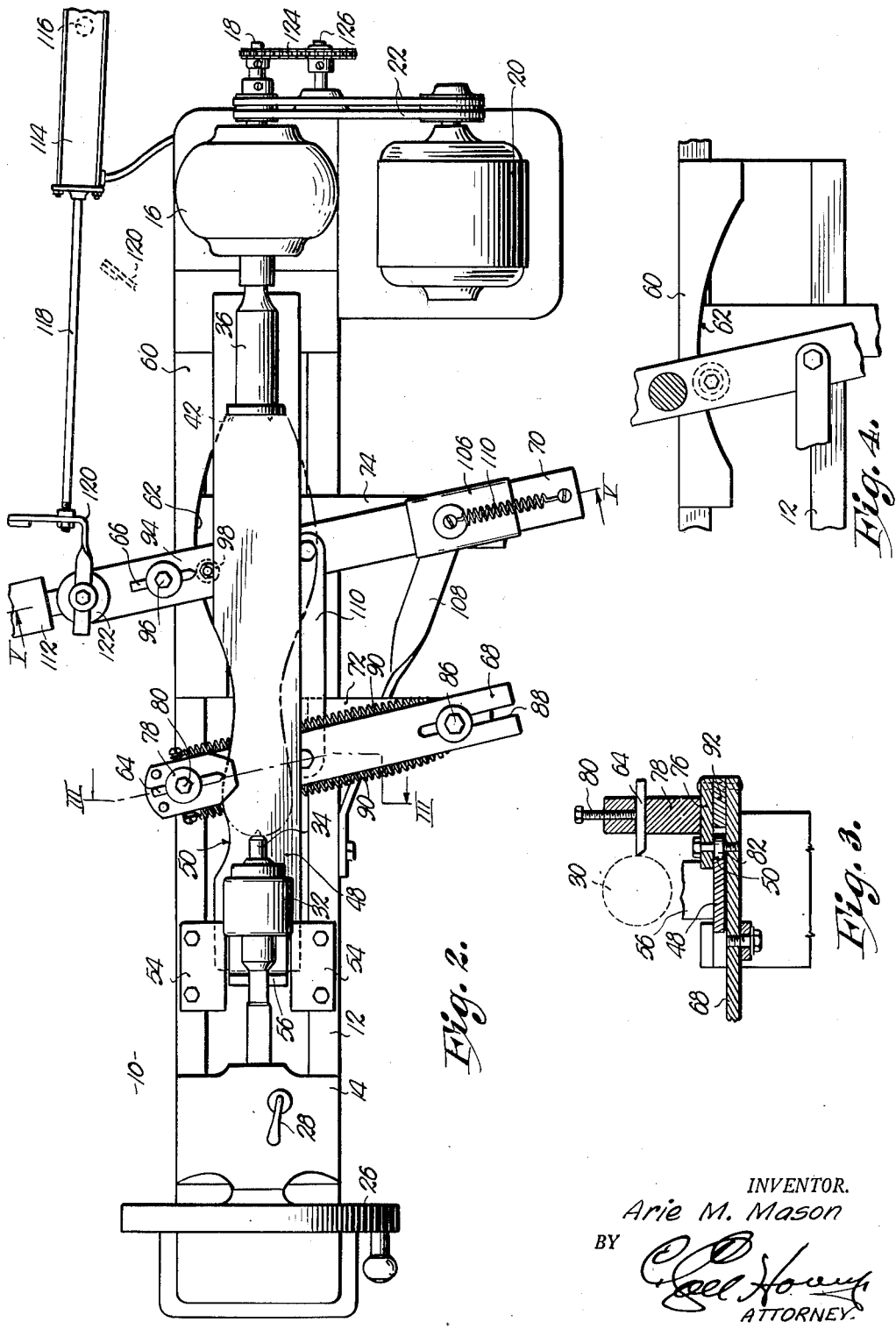
INVENTOR.
Arie M. Mason
BY
ATTORNEY.

Patented Dec. 23, 1952

2,622,635

UNITED STATES PATENT OFFICE 2,622,635

BOWLING PIN DRESSING MACHINE

Arie M. Mason, Kansas City, Mo., assignor to Mason Plastics Co., Inc., Kansas City, Kans., a corporation of Kansas Application October 25, 1950, Serial No. 192,096

6 Claims. (Cl. 142—7)

This invention relates to work-shaping or trimming tools such as wood-turning lathes, the primary object being to provide an attachment for a conventional lathe to adapt the same for shaping irregular work and having means of adjustment for maintaining a predetermined contour in a portion of the work irrespective of variances in lengths thereof.

One of the most difficult problems in re-shaping of bowling pins that have become damaged through extensive use, preparatory to refinishing the same is to maintain the necessary contour of the lowermost "belly portion" thereof against which the bowling ball normally contacts.

It is highly desirable to provide in a re-shaping machine for such articles, means to adjust the same to accommodate pins of differing lengths and accordingly, it is the most important object hereof to not only include such adjustment but to form the same in a manner to maintain the aforesaid contour irrespective of the length of the pin to be re-shaped.

Another important object of this invention is the provision of a bowling pin re-shaping apparatus having a pair of cutting tools engageable with the pin and reciprocable therealong for shaping the same in a number of irregular arcuate contours, each tool having a guiding template, one of which is adjustable according to the length of the bowling pin to be re-shaped and at that end of the pin which normally is not contacted by the bowling ball.

Another object of this invention is the provision of a woodworking tool in the nature of a lathe having a reciprocable tail stock spindle to accommodate pins of differing lengths, the one template above mentioned being connected directly with such spindle for reciprocable movement therewith when adjustment is to take place.

Other objects of the invention include the way in which the work-engaging cutting tools are pivotally coupled together for simultaneous movement; the manner of holding the mounting means for the tools yieldably biased against a cam edge of the respective templates; the way in which the individual cutting tools as separately mounted and individually adjustable; and many more minor objects including details of construction all of which will be made clear or become apparent as the following specification progresses, reference being had to the accompanying drawings, wherein:

Figure 1 is a side elevational view of a bowling pin dressing machine made pursuant to the present invention.

Fig. 2 is a top plan view thereof.

Fig. 3 is a detailed, transverse, cross-sectional view taken on irregular line III—III of Fig. 2.

Fig. 4 is a fragmentary, detailed, sectional view taken on line IV—IV of Fig. 1 looking in the direction of the arrows.

Fig. 5 is a transverse, cross-sectional view taken on line V—V of Fig. 2; and

Fig. 6 is an enlarged, sectional view taken on line VI—VI of Fig. 1.

As above indicated, one of the most difficult problems that is presented in the shaping and dressing of bowling pins, particularly those that have been in use and become damaged thereby, lies in the difference in the lengths of such pins. In conventional shaping machines it is impossible to accommodate all of such pins and maintain the same shape therein at the point of ball contact. Such difficulties are overcome through use of apparatus such as that about to be described and there is included therein a conventional lathe broadly designated by the numeral 10 and including a bed 12, a tail stock 14 and a head stock 16.

Normally the head stock 16 is rigidly mounted upon the bed 12 while the tail stock 14 is carried by bed 12 for movement toward and away from the head stock 16. Such manner of adjusting the tail stock 14 forms no part of the present invention and therefore, is not shown in detail.

Head stock 16 is provided with a live or front spindle 18 that is driven or rotated in any suitable manner such as through the provision of an electric motor or other prime mover 20. Belts 22 trained over pulleys on shaft 18 and the drive shaft of motor 20, serve as a driving connection between motor 20 and the spindle 18.

The tail stock 14 is provided with a dead or back spindle 24 that is reciprocably carried thereby and such reciprocable movement is afforded through rotation of a hand wheel 26 on one end of the spindle 24. A lock 28 carried by the tail stock 14 releasably holds the spindle 24 against reciprocable movement toward and away from the live spindle 18.

The work to be shaped by the present machine constitutes a conventional bowling pin 30 that is held and rotated while being shaped through the medium of horizontal centers on spindles 18 and 14 respectively. Spindle 24 carries a chuck 32 having a center pin 34, there being a hole in the normally uppermost end of the pin 30 for receiving the pin 34.

A tubular body member 36 is secured directly to the spindle 18 for rotation therewith and has a reciprocable pin 38 mounted therein that likewise receives the bowling pin 30 through a hole in the bottom thereof. The pin or plunger 38 is yieldably held biased outwardly toward the pin 34 through the medium of a spring 40 within body 36. A plurality of blocks 42 on body 36 pierce the normally lowermost end of the bowling pin 30 when the same is in the position illustrated in Figs. 1 and 2, thereby imparting rotative movement to the bowling pin 30 on the pin 34 as spindle 18 is rotated by prime mover 20.

The improvement forming the subject matter of this invention is mounted directly upon the bed 12 of lathe 10 as an attachment thereto and includes a pair of spaced-apart, upstanding blocks 44 and 46 respectively, reciprocably mounting an elongated template 48 having a cam edge 50 formed in a plurality of curves as illustrated in Fig. 2 of the drawings. The elongated template 48 has a longitudinally-extending, centrally-disposed slot 51 formed therein for slidably receiving a guide bolt or the like 52 carried by and extending upwardly from block 46. The opposite end of the template 48 is slidably carried by the block 44, and a pair of spaced plates 54 partially overlap the template 48 to hold the same in place. That end of the template 48 adjacent block 44 has an upstanding ear 56 that is adjustably secured to the chuck 32 through the medium of a bolt 58. Consequently, the template 48 is reciprocated on its longitudinal axis on blocks 44 and 46 upon reciprocable movement of the spindle 24 by actuation of hand wheel 26.

A second template 60 is mounted rigidly to the bed 12 in any suitable manner within a horizontal plane parallel with and below the plane of template 48, there being an arcuate cam edge 62 forming a part of the template 60. It is noted that the cam edge 62 of template 60 faces oppositely to the cam edge 50 of template 48 and near the rotatable pin 38 whereas the cam edge 50 is adjacent the dead center pin 34.

There are provided cutting or shaping tools 64 and 66 for templates 48 and 60 respectively, carried by elongated arms 68 and 70 respectively. The arms 68 and 70 are in turn swingably and reciprocably mounted upon elongated, spaced-apart bars 72 and 74 respectively mounted upon bed 12 and projecting laterally therefrom between tail stock 14 and head stock 16.

A small plate 76 rigidly secured to the arm 68 and overlapping template 48 at one end thereof carries an upstanding post 78 serving as a holder for tool 64, passing through post 78 and adjustably held in place by set screw 80.

Tool 64 is preferably disposed on the horizontal center of bowling pin 30 when the same is in an operative position carried by center pins 34 and 38 and is also directly above a roller 82 carried by plate 76 and arm 68 in direct alignment with the edge 50 of template 48. An upstanding post 84 on the outermost projected end of bar 72 carries a pivot bolt 86 for slidably and swingably receiving the arm 68 by means of a slot 88 formed in the latter at that end thereof opposite to the plate 76 and post 78.

The roller 82 is yieldably held biased against the cam edge 50 of template 48 through the medium of a pair of springs 90 joining the post 84 and a spacer 92 between plate 76 and arm 68.

The tool 66 is adjustably mounted similarly to tool 64 by an upstanding post or shank 94 having a holding setscrew 96, post 94 being supported by the arm 70 on the same side of bowling pin 30 as the post 78 and cutting tool 64. The arm 70 rests upon the template 60 and has a roller 98 that is yieldably held biased against the cam edge 62 by means of a spring 100 joining one end of the arm 70 with a bolt 102 carried by the bar 74 and projecting upwardly therefrom. The bolt 102 passes through a slot 104 formed in the arm 70 and a shield 106 slidable longitudinally on the arm 70 in covering relationship to the slot 104, protects the latter against filling with dust and other foreign matter. It is noted that the bolt 102 passes upwardly through the shield 106 and receives spring 100 at the uppermost end thereof.

A brace member 108 interconnects the bar 74 at the outermost extended end thereof through the medium of bolt 102 with bed 12. The arms 68 and 70 are pivotally interconnected through the medium of a short link 110. A weight 112 on that end of the arm 70 opposite to slot 104 balances the arm 70 as the same swings and reciprocates along its path of travel as hereinafter described. Simultaneous movement is imparted to the arms 68 and 70 and to the cutting tools 64 and 66 respectively carried thereby by means of an hydraulic system that includes a cylinder 114 mounted for swinging movement on a vertical axis by means of a pivot pin 116. Cylinder 114 is provided with a conventional piston not shown, having an outwardly extending reciprocable stem 118 that is joined to the arm 70 by means of an L-shaped bracket 120 and a block 122 on arm 70.

A compressor for the hydraulic fluid to operate the aforesaid hydraulic system (not shown) may be conveniently driven by motor 20 through the medium of a continuous chain 124 interconnecting spindle 18 and a shaft 126 forming a part of such compressor. The hydraulic system may be operated in the conventional manner through the medium of suitable valves not shown, and it is preferred that when the stem 118 is fully extended, such valve control means be manually operated to cause the stem 118 to be retracted into the cylinder 114. However, when the stem 118 reaches the innermost end of its path of travel such valve control may be conveniently actuated by one end of the bracket 120 that moves to the dotted line position illustrated in Fig. 2, whereby the arms 68 and 70 are automatically returned to that end of their paths of travel next adjacent the dead center pin 34.

It is seen that in operation, reciprocable movement of the stem 118 imparts swinging movement simultaneously to the two arms 68 and 70 and that as the same are thus moved along paths of travel between the tail stock 14 and head stock 16, rollers 82 and 98 will be held against the respective cam edges 50 and 62 by springs 90 and 100 respectively. Accordingly, by virtue of the fact that arms 68 and 70 are each mounted for free swinging and reciprocable movement on pivots 86 and 102 respectively, the path of travel of the cutting tools 64 and 66 will conform with the contours of the respective cam edges 50 and 62. Inasmuch as the template 60 is rigidly mounted, the path of travel of the cutting tool 66 will remain constant irrespective of the length of bowling pin 30 to be shaped and therefore, the lowermost ball-receiving portion of bowling pin 30 will be maintained in a predetermined desired shape and contour. However, differing lengths of bowling pins 30 to be shaped will necessitate movement of the center pin 34 toward and away from the pin 38 and when such adjustment of the spindle 24 takes place by the medium of hand wheel 26, the template 48 will likewise be shifted along its longitudinal axis. Such adjustment of the spindle 24 will shift the cam edge 50 of template 48 and while the uppermost ends of bowling pins 30 will vary according to their lengths, the lowermost ball-receiving end of the pin 30 will always remain the same as aforesaid.

It is seen that the attachment hereof may be adapted for lathes of differing characters and that many details of construction of the attachment per se may be changed or modified, all within the spirit of this invention and accordingly, it is desired to be limited only by the scope of the appended claims.

Having thus described the invention what is claimed as new and desired to be secured by Letters Patent is:

1. In combination, a lathe having a head stock provided with a rotatable spindle and a tail stock provided with a spindle, mounted therein for reciprocable movement toward and away from the rotatable spindle, and having releasable means for holding the same in an adjusted position, said spindles being adapted to rotatably support work to be shaped; a work-engaging, cutting tool having means mounting the same for movement along a path of travel between the head stock and the tail stock; means for moving the cutting tool; a guiding template for said cutting tool; and means for holding said mounting means in engagement with the template, said template being attached to said tail stock spindle and mounted for reciprocable movement therewith.

2. In combination, a lathe having a head stock provided with a rotatable spindle and a tail stock provided with a spindle, mounted therein for reciprocable movement toward and away from the rotatable spindle, and having releasable means for holding the same in an adjusted position, said spindles being adapted to rotatably support work to be shaped; an elongated template disposed between the tail stock and the head stock and having a cam edge extending longitudinally thereof; a work-engaging, cutting tool having a support mounted for movement along said cam edge; means for holding the support in engagement with said cam edge; means for moving the cutting tool; and means coupling said template with the tail stock spindle for reciprocable movement toward and away from the head stock and on the longitudinal axis of the template upon reciprocation of the tail stock spindle.

3. In combination, a lathe having a head stock provided with a rotatable spindle and a tail stock provided with a spindle, mounted therein for reciprocable movement toward and away from the rotatable spindle, and having releasable means for holding the same in an adjusted position, said spindles being adapted to rotatably support work to be shaped; a number of interconnected, work-engaging, cutting tools, each having means mounting the same for movement along a path of travel between the head stock and the tail stock; a guiding template for each cutting tool respectively; means common to the tools for moving the same; and means for each mounting means respectively for holding the same against their corresponding templates, one of said templates being mounted for reciprocable movement along a path of travel between the tail stock and the head stock and having connection with the tail stock spindle for movement with the latter as the same is reciprocated.

4. In combination, a lathe having a head stock provided with a rotatable spindle and a tail stock provided with a spindle, mounted for reciprocable movement toward and away from the rotatable spindle, said spindles being adapted to rotatably support work to be shaped; a number of elongated, swingable arms mounted for reciprocable movement on their longitudinal axes; a work-engaging, cutting tool carried by each arm respectively; a guiding template for each arm respectively; means for moving the arms and the tools carried thereby along the templates as the same swing and reciprocate in conformance with the contours of the templates; and means for each arm respectively for holding the same against their corresponding templates.

5. In combination, a lathe having a head stock provided with a rotatable spindle and a tail stock provided with a spindle, mounted therein for reciprocable movement toward and away from the rotatable spindle, and having releasable means for holding the same in an adjusted position, said spindles being adapted to rotatably support work to be shaped; a number of elongated, swingable arms mounted for reciprocable movement on their longitudinal axes; a work-engaging, cutting tool carried by each arm respectively; a guiding template for each arm respectively; means for moving the arms and the tools carried thereby along the templates as the same swing and reciprocate in conformance with the contours of the templates; and means for each arm respectively for holding the same against their corresponding templates one of said templates being mounted for reciprocable movement along a path of travel between the tail stock and the head stock and having connection with the tail stock spindle for movement with the latter as the same is reciprocated.

6. In combination, a lathe having a head stock provided with a rotatable spindle and a tail stock provided with a normally stationary spindle, mounted for reciprocable movement toward and away from the rotatable spindle, said spindles being adapted to rotatably support work to be shaped; a number of elongated, swingable arms mounted for reciprocable movement on their longitudinal axes; a work-engaging, cutting tool carried by each arm respectively; a guiding template for each arm respectively; and means for moving the arms and the tools carried thereby along the templates as the same swing and reciprocate in conformance with the contours of the templates, each template having an irregular cam edge, there being means for each arm respectively for yieldably holding a part thereof biased against a respective cam edge.

ARIE M. MASON.

REFERENCES CITED

The following references are of record in the file of this patent:

UNITED STATES PATENTS

| Number | Name | Date |
| --- | --- | --- |
| 1,239,027 | Mentzer | Sept. 4, 1917 |
| 1,277,203 | Ensign | Aug. 27, 1918 |
| 1,294,500 | Lyons | Feb. 18, 1919 |
| 1,946,253 | Winkle | Feb. 6, 1934 |
| 2,556,595 | McNickle | June 12, 1951 |